United States Patent
Gresset (10) Patent No.: US 10,070,591 B2
(45) Date of Patent: Sep. 11, 2018

(54) BALE WRAPPING DEVICE

(71) Applicant: DEERE & COMPANY, Moline, IL (US)

(72) Inventor: Pascal Gresset, Auxon Dessous (FR)

(73) Assignee: DEERE & COMPANY, Moline, IL (US)

( * ) Notice: Subject to any disclaimer, the term of this patent is extended or adjusted under 35 U.S.C. 154(b) by 526 days.

(21) Appl. No.: 14/799,706

(22) Filed: Jul. 15, 2015

(65) Prior Publication Data

US 2016/0037725 A1    Feb. 11, 2016

(30) Foreign Application Priority Data

Aug. 8, 2014    (DE) .......................... 10 2014 215 729

(51) Int. Cl.
*A01F 15/07* (2006.01)

(52) U.S. Cl.
CPC .... *A01F 15/0715* (2013.01); *A01F 2015/072* (2013.01)

(58) Field of Classification Search
CPC ........... A01F 15/0715; A01F 2015/072; B65H 23/085; B65H 59/06
USPC ...................................................... 242/421.2
See application file for complete search history.

(56) References Cited

U.S. PATENT DOCUMENTS

| | | | |
|---|---|---|---|
| 4,790,125 A * | 12/1988 | Merritt, III | ......... A01F 15/0715 226/176 |
| 5,181,368 A | 6/1993 | Anstey | |
| 6,029,420 A * | 2/2000 | Tertilt | ................. A01F 15/0715 53/118 |
| 6,651,408 B1 * | 11/2003 | McClure | ............. A01F 15/0715 242/421.2 |
| 6,981,352 B2 * | 1/2006 | Chow | ................. A01F 15/0715 53/118 |

(Continued)

FOREIGN PATENT DOCUMENTS

| | | |
|---|---|---|
| DE | 102005015224 A1 | 10/2006 |
| DE | 102005015225 A1 | 10/2006 |

(Continued)

OTHER PUBLICATIONS

European Search Report in foreign counterpart application No. 15177337 dated Jan. 14, 2016 (7 pages).

(Continued)

*Primary Examiner* — Thanh Truong
*Assistant Examiner* — Patrick Fry (57) ABSTRACT

A bale wrapping device is described for a round baler. The bale wrapping device may include a supply reel for the wrapping material and a pressing device wherein the pressing device in an engagement position stands in engagement with the supply reel and for a standby position can be pivoted away from the supply reel, wherein the pressing device is connected at a contact point positioned on the pressing device to power means which generate via the contact point a controlling torque which acts on the pressing device. In order to facilitate the replacement of the supply reel and more particularly the pivoting of the pressing device out from an engagement position into a standby position, an adjusting means may be provided through which the contact point can be shifted and thus the controlling torque can be altered.

8 Claims, 10 Drawing Sheets

(56) References Cited

U.S. PATENT DOCUMENTS

| | | |
|---|---|---|
| 7,237,372 B2 | 7/2007 | Chapon et al. |
| 7,900,427 B2 | 3/2011 | Chapon et al. |
| 7,946,095 B2 * | 5/2011 | Olander .............. A01F 15/0715 53/118 |
| 8,490,366 B1 * | 7/2013 | Hintz .................. A01F 15/0715 242/422.4 |

FOREIGN PATENT DOCUMENTS

| | | |
|---|---|---|
| EP | 1707045 A1 | 10/2006 |
| EP | 1872648 A1 | 1/2008 |
| GB | 2326870 A | 1/1999 |

OTHER PUBLICATIONS

German Search Report issued in counterpart application No. 10 2014 215 729.3, dated May 4, 2015 (8 pages).

\* cited by examiner

BALE WRAPPING DEVICE

CROSS-REFERENCE TO RELATED APPLICATIONS

Pursuant to 35 USC § 119, this application claims the benefit of and priority to German patent application no. 102014215729.3, filed on Aug. 8, 2014, which is herein incorporated by reference in its entirety.

FIELD OF THE DISCLOSURE

The invention relates to a bale wrapping device for a round baler. The invention further relates to a round baler with one such wrapping device.

BACKGROUND

Bale wrapping devices for round balers are known. The pressed material, by way of example agricultural harvested material, but also paper or material residues, which has been shaped in round balers into round bales, is thereby wrapped with a wrapping material, by way of example net or foil. Bale wrapping devices of this kind are usually provided with a supply mechanism for introducing the wrapping material into a pressing chamber of the round baler, wherein the supply mechanism in a supply movement draws the wrapping material off from a supply reel and introduces it into an arranged supply opening of the pressing chamber. The supply reel is as a rule charged with a certain pretensioning force by a contact pressure device so that the wrapping material can be wrapped around the bale with a corresponding tension. The supply reel is mounted at a supply chamber formed on the frame of the baler and has to be replaced when the wrapping material has been used up. Replacing the reel takes place with a relatively high effort since on the one hand the weight of the supply reel has to be managed and on the other hand the pressing device has to be released from the power means acting with a controlling torque on the pressing device, or it is necessary to work against the controlling torque which is acting on the pressing device. It is therefore endeavoured to simplify and make more user friendly the replacement process for the supply reel.

SUMMARY

The object of the invention is therefore to provide a bale wrapping device through which the aforementioned problems are overcome.

This is achieved according to the invention through the instruction of patent claim 1. Further advantageous configurations and developments of the invention are apparent from the dependent claims.

A bale wrapping device for a round baler is proposed having a supply reel and a pressing device. The pressing device engages in an engagement position with the supply reel and is furthermore capable of pivoting away from the supply reel into a standby position, wherein the pressing device is connected at a contact point which is provided on the pressing device to the power means which generate via the contact point a controlling torque which acts on the pressing device. Furthermore adjusting means are provided through which the contact point can be shifted and thus the controlling torque can be altered. By actuating the adjusting means the contact point of the power means acting with a controlling torque on the pressing device can be shifted, as a result of which the controlling torque is reduced or even reversed so that during a replacement process for replacing the supply reel or during a standby process the pressing device can be pivoted from an engagement position into a standby position with only a slight effort or without any effort or even with an assisting controlling torque. It can thereby be avoided in particular that during a replacement process of the supply reel a release of the pressing device from the power means applying the controlling torque is required. A standby expense is thereby effectively reduced.

In an engagement position of the pressing device and in an operating position of the adjusting means the contact point can be positioned so that the controlling torque presses the pressing device onto the supply reel. In the engagement position of the pressing device the pressing device lies on the supply reel with a bearing pressure produced by the controlling torque. A pretensioning moment is thereby transferred to the supply reel so that during a wrapping process the wrapping material is wound round the bale under a certain tension. The adjusting means are thereby located in an operating position in which the contact point of the power means can act on the pressing device with maximum lever about a pivotal axis of the pressing device and thus the controlling torque in this configuration (engagement position of the pressing device and operating position of the adjusting means) is at the highest.

When the supply reel is fitted the contact point of the power means applying the controlling torque, in an engagement position of the pressing device and in a standby position of the adjusting means, can be positioned so that the controlling torque acts opposite a controlling torque in the operating position. By bringing the adjusting means into the standby position the contact point of the power means is shifted so that the contact point of the power means is positioned on the opposite side of the pivotal axis of the pressing device so that the controlling torque is reversed and thus the controlling torque in this configuration (engagement position of the pressing device and standby position of the adjusting means) no longer exerts any contact pressure in the direction of the supply reel. Rather it assists a pivotal movement of the pressing device away from the supply reel. In this configuration the pressing device can be pivoted with the supporting controlling torque from the engagement position into a standby position for replacing the supply reel.

In a standby position of the pressing device and in a standby position of the adjusting means the contact point can be positioned so that the controlling torque assists a pivotal movement in the direction of the supply reel. In the standby position the pressing device is located in a pivoted-up position in which free access is produced to the supply reel. During the pivotal process of the pressing device from the engagement position into the standby position and with the standby position of the adjusting means already set in the engagement position of the pressing device the contact point moves again to the opposite side of the pivotal axis so that when the pressing device is pivoted up, thus in the standby position of the pressing device, the controlling torque has changed from a controlling torque acting in a direction away from the supply reel into a controlling torque acting towards the supply reel. It is thereby achieved that once the exchange of the supply reel has been concluded or after the standby operations, the pivoting of the pressing device back from a standby position into an engagement position is assisted by a controlling torque.

The adjusting means comprise a first guide groove formed in at least one pivotal arm of the pressing device, a guide plate connected to an adjusting axis and formed with a second guide groove, and a guide bolt which connects the at least one pivotal arm and the guide plate and which is mounted displaceable in the second guide groove, wherein the adjusting axis is positioned displaceable in the first guide groove. The guide plate is preferably connected rotationally secured to the adjusting axis so that turning the adjusting axis causes the guide plate to pivot. Then as a result of this the guide bolt guided in the second guide groove is displaced which in turn causes a pivotal movement of the pivotal arm. Finally through the pivotal movement of the pivotal arm the adjusting axis guided in the first guide groove is displaced. Thus a rotation introduced at the adjusting axis forces a translation movement of the adjusting axis along the first guide groove.

The adjusting means furthermore comprise a control lever which is connected secured against rotation to the adjusting axis so that by actuating the control lever, preferably by pivoting the lever about a rotational axis which is coaxial with the adjusting axis, a rotation of the adjusting axis results.

The pressing device is mounted on a pivotal axis which is positioned locally fixed relative to the supply reel—capable of pivoting into an engagement position or into a standby position—wherein a position of the contact point relative to the pivotal axis can be altered by way of the adjusting means. The locally fixed bearing of the pivotal axis takes place by way of example on a frame or a housing part of the bale press or on other fixedly mounted component parts. In the engagement position the pressing device lies on the supply reel or is in engagement therewith, wherein the engagement position comprises several pivotal settings of the pressing device, since the pivotal position changes as more and more of the wrapping material which is guided on the supply reel is used up.

The power means are preferably connected to the adjusting axis of the adjusting means so that the displacement described above of the adjusting axis which is guided in the first guide groove on the pivotal arm of the pressing device leads to a displacement of the contact point of the power means.

The bale wrapping device mentioned above is particularly suitable for use in a round baler of the agricultural type for pressing harvested material, cut material, stalk stock etc. However other useful fields can also be conceivable, by way of example in the region of the paper industry or the recycling of textiles and other consumer materials. Particularly suitable as wrapping material is netting or foil which is wrapped in one or more layers around the bales to keep them in shape for better handling or also for protecting the round bales against climatic conditions. The use of foil is furthermore also intended for storing the round bales for silage purposes.

The invention as well as further advantages and advantageous further developments and configurations of the invention will now be described and explained in further detail with reference to the drawings which illustrate an embodiment of the invention.

DETAILED DESCRIPTION

Figure 1:
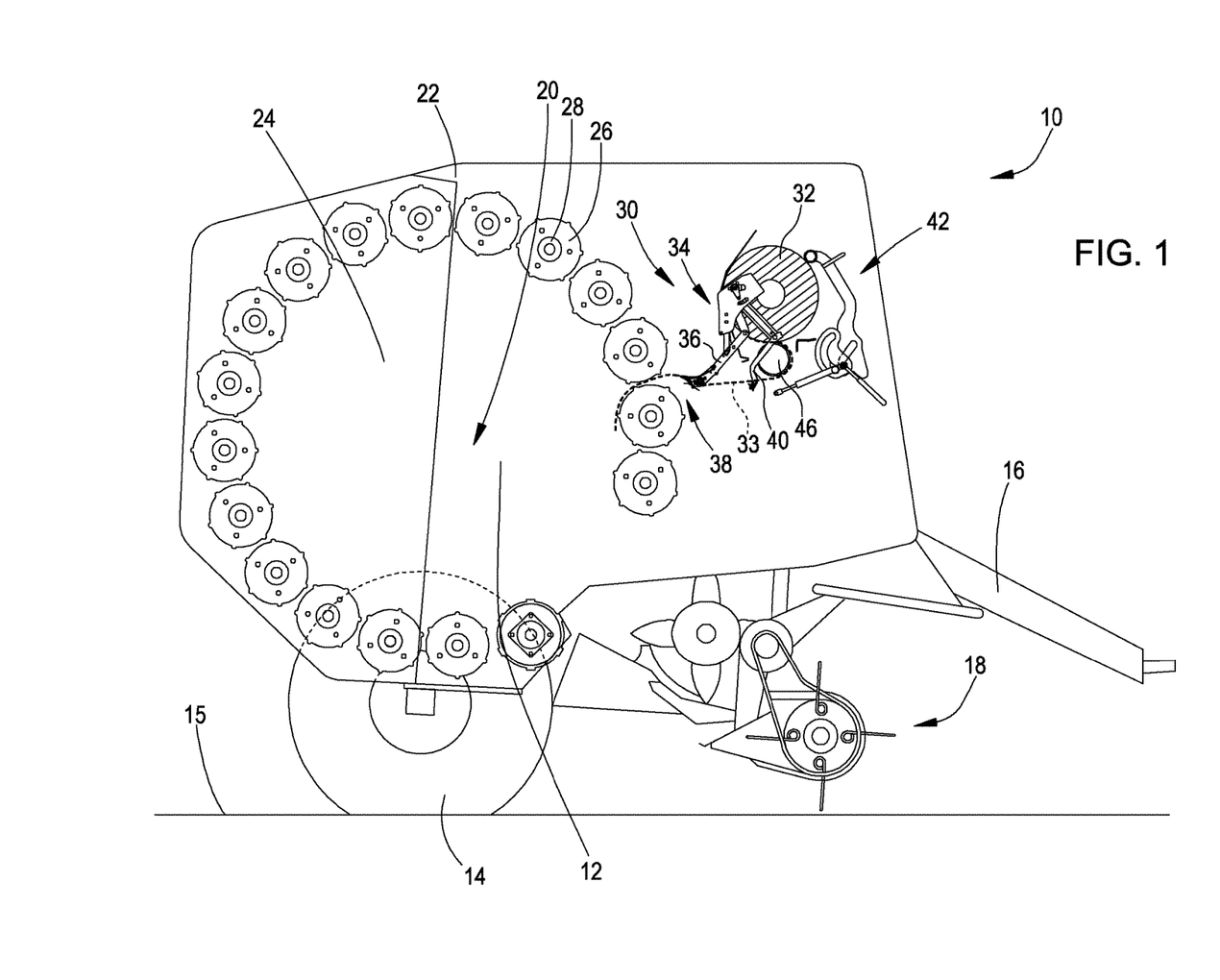
FIG. 1 a diagrammatic side view of a round baler with a bale wrapping device.

A round baler 10 illustrated diagrammatically in FIG. 1 comprises a first housing part 12 which is supported by means of wheels 14 on the ground 15 and can be connected by means of a drawbar 16 to a towing vehicle (not shown), e.g. an agricultural tractor.

A pick-up and conveying unit 18 for harvested material is located in known manner on a front lower side of the first housing part 12 in the forward driving direction, wherein the first housing part 12 surrounds a front part of a bale pressing chamber 20. A bearing 22 for a pivotal second housing part 24 which surrounds a rear part of the bale pressing chamber 20 is located on the rear upper corner region of the first housing part 12. The second housing part 24 in the opened state (not shown) opens up an outlet (not shown) through which a bale (not shown) pressed by the round baler 10 can be set down or unloaded or ejected. The pivotal second housing part 24 can be actuated (opened and closed) by means of control motors (not shown) and thus represents an outlet flap for a bale which is pressed in the bale pressing chamber 20.

The round baler 10, designed with a bale pressing chamber 20 of non-variable size, contains a plurality of pressing elements in the form of pressing rollers 26 running parallel to one another for pressing harvested material (as an example only one pressing roller 26 was provided here with the reference numeral "26"), whose rotational axes 28 when the second housing part 24 is closed are placed on a circular arc, and of which at least some are driven. Alternatively the round baler 10 can also be designed in known way as one with a bale pressing chamber 20 of variable size or as a round baler 10 with variable bale pressing chamber 20, wherein the pressing elements can then be formed, likewise in known manner, as belts, bands or chain assemblies (not shown).

The round baler 10 furthermore comprises a bale wrapping device 30 which is equipped with a supply reel 32 for wrapping material 33. Net or also foil can preferably be used as the wrapping material. The bale wrapping device 30 comprises a supply mechanism 34 for the wrapping material 33 by means of which the wrapping material 33 is guided from the supply reel 32 into the bale pressing chamber 20.

After the actual pressing process, thus picking up the harvested material and the formation of a round bale by the pressing rollers 26, has been concluded, driving over the ground 15 is stopped since the round baler 10 is filled with the round bale and no more harvested material is to or can be picked up into the bale pressing chamber 20. At this moment the bale wrapping device 30 is also activated and a wrapping process is then initiated following the pressing process. Through ongoing rotation of the round bale located in the bale pressing chamber the wrapping material 33 is wrapped around the round bale 20. Once the wrapping process has been completed the round bale is let down via an unloading ramp (not shown) onto the ground 15 by opening the outlet flap (second housing part 24). The drive is then started up again with the round baler 10 and a new pressing process begins.

The supply unit 34 comprises a beak-like supply arm 36 which draws the wrapping material 33 off from the supply reel 32 in the direction of the pressing chamber 20. An area of the pressing chamber 20 facing the supply mechanism 34 is provided with a supply opening 38.

When initiating a wrapping process the supply arm 36 is now guided in the direction of the pressing chamber 20, more particularly into the supply opening 38, through a mechanically triggered supply movement so that the free end of the wrapping material can come into contact with the round bale which is rotating in the pressing chamber 20, and the wrapping material is drawn along and picked up. Through the rotation of the round bale the wrapping material 33 is wound in one or more layers around the peripheral surface of the round bale. The wrapping process is completed with a separating process (not shown) through a cutting device 40 wherein the wrapping material which is wrapped around the round bale is separated from the stock wrapping material 33.

As shown in FIG. 1 and in FIGS. 6 to 10 the bale wrapping device 30 furthermore comprises a pressing device 42, a base 44 for supporting the supply reel 32, as well as a contact pressure roller 46 for supporting and driving the supply reel 32.

Figure 2:
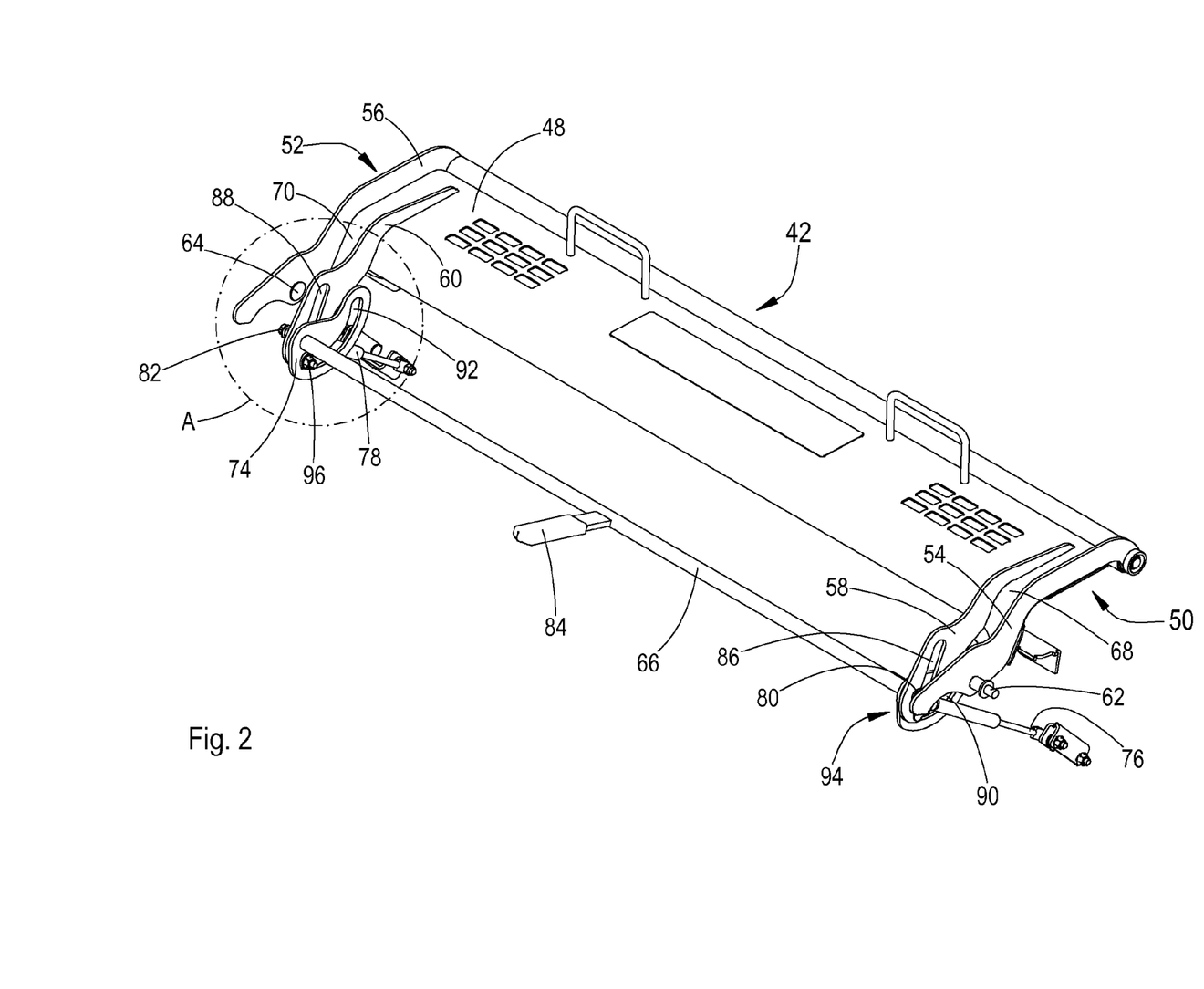
FIG. 2 a perspective side view of a pressing device with adjusting means (A) according to the bale wrapping device of FIG. 1.
Figure 3:
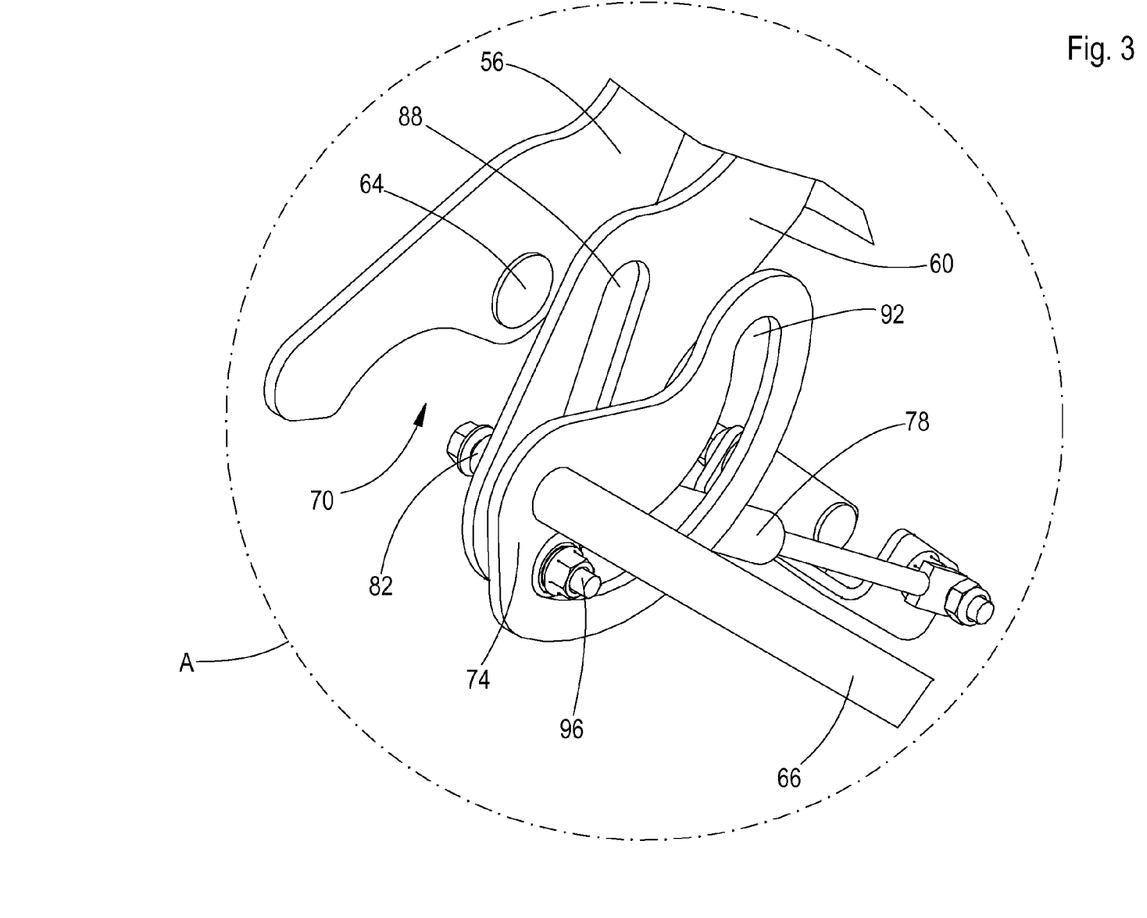
FIG. 3 a perspective side view of the adjusting means of FIG. 2 in detail.
Figure 4:
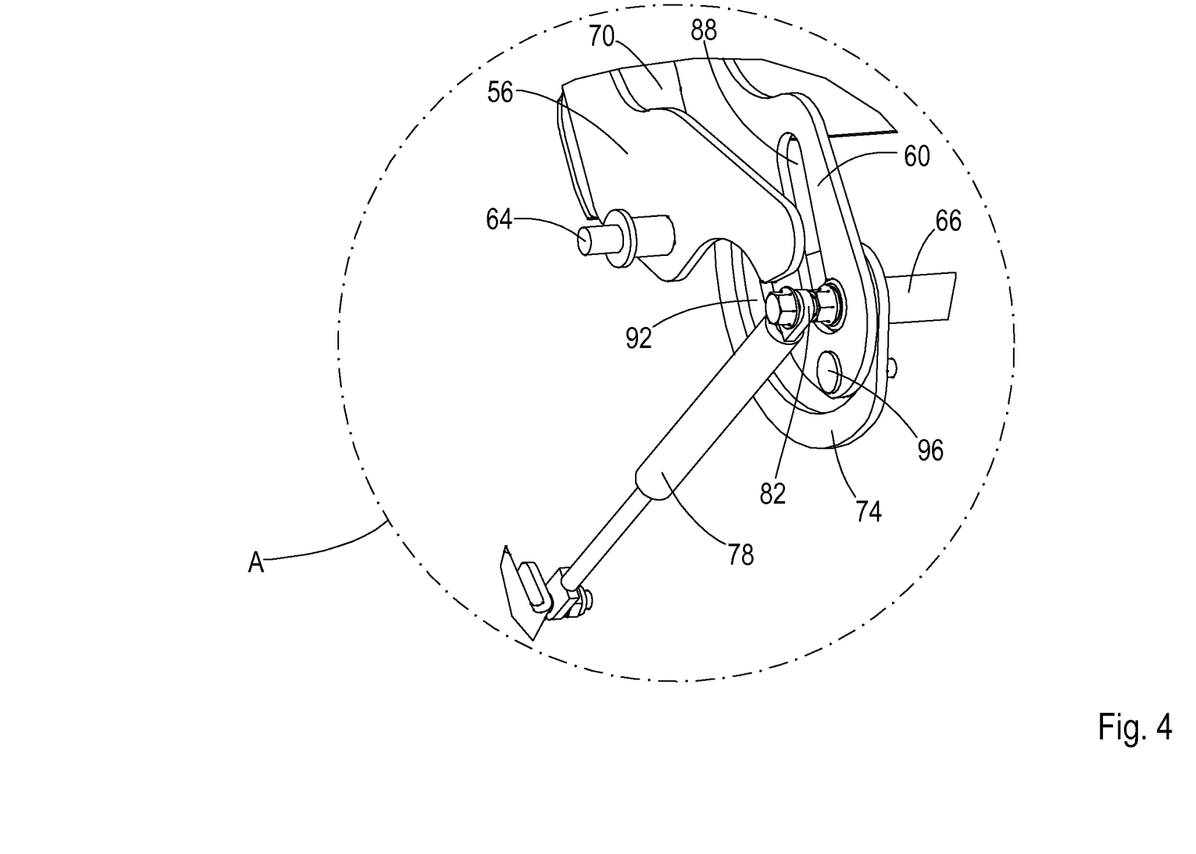
FIG. 4 a further perspective side view of the adjusting means of FIG. 2 in detail.
Figure 5:
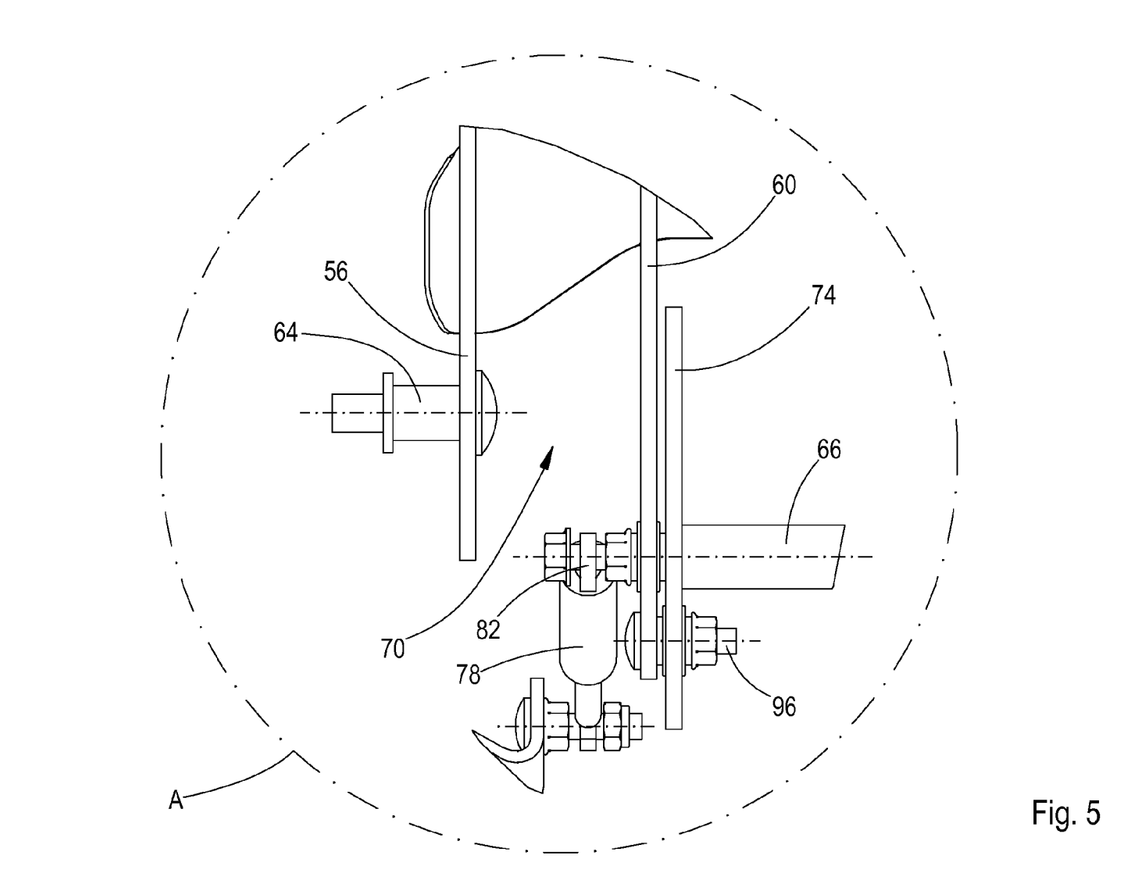
FIG. 5 a plan view of the adjusting means of FIG. 2 in detail.

The pressing device 42 is shown in detail in FIG. 2. It comprises a pressing frame 48 which extends in the broad direction for the round baler 10. The pressing frame 48 is provided at its lateral ends 50, 52 with outer pivotal arms 54, 56 and with inner pivotal arms 58, 60, wherein the outer pivotal arms 54, 56 are mounted for pivotal movement about pivotal axes 62, 64 positioned locally fixed on the housing part 12 at the sides of the pressing frame 48, and the inner pivotal arms 58, 60 are mounted for pivotal movement about an adjusting axis 66 which extends centrally along the pressing frame 48. The outer and inner pivotal arms 54, 58 and 56, 60 are connected fixedly to one another above the pressing frame 48, wherein the outer and inner pivotal arms 54, 58 and 56, 60 are each arranged parallel spaced from one another so that a gap 68, 70 is formed respectively between the outer and inner pivotal arms 54, 58 and 56, 60. The pressing device 42 furthermore comprises guide plates 72, 74 which are connected rotationally secured to the adjusting axis 66 either side of the pressing frame 48 and are arranged on the inside next to the inner pivotal arms 56, 60.

Furthermore power means 76, 78 are arranged underneath and each side of the pressing frame 48 in the form of gas compression springs which at one end are supported on the housing part 12 and at the other end are connected to the adjusting axis 66 in the region of the gap 68 and 70 respectively, wherein the ends of the adjusting axis 66 serve as contact points 80, 82. Instead of the gas compression springs other spring systems can also be used here such as torsion springs or coil springs. The adjusting axis 66 is furthermore connected rotationally secured to an adjusting lever 84 which is arranged centrally relative to the adjusting axis 66 and which extends perpendicular to the adjusting axis 66.

As can be seen in detail in FIGS. 3 to 10, the inner pivotal arms 58, 60 each have an l-shaped first guide groove 86, 88 and the guide plates 72, 74 each have an arcuate second guide groove 90, 92. Furthermore on each of the inner pivotal arms 58, 60 is a guide bolt 94, 96 which starting from the respective pivotal arm 58, 60 extends inwards in the direction of the second guide groove 90, 92 of the respective adjacent guide plate 74, 76 and is mounted displaceable in the respective second guide groove 90, 92 and thus connects the respective inner pivotal arm 58, 60 to the respective guide plate 74, 76. The adjusting axis 66 is guided in the first guide grooves 86, 88 of the inner pivotal arms 58, 60 so that the respective inner pivotal arm 58, 60 is arranged between the respective contact point 80, 82 and the respective guide plate 72, 74. The feature described above is shown in detail in FIGS. 3, 4 and 5 for the left side (in FIG. 2) of the pressing device 42.

The adjusting axis 66, the adjusting lever 84, the guide plates 72, 74, the guide grooves 90, 92 as well as the guide bolts 94, 96 thus form the adjusting means (A) through which the respective contact point 80, 82 of the respective power means 76, 78 can be moved, as shown below in FIGS. 6 to 10 for the aforementioned right side of the pressing device 42.

Figure 6:
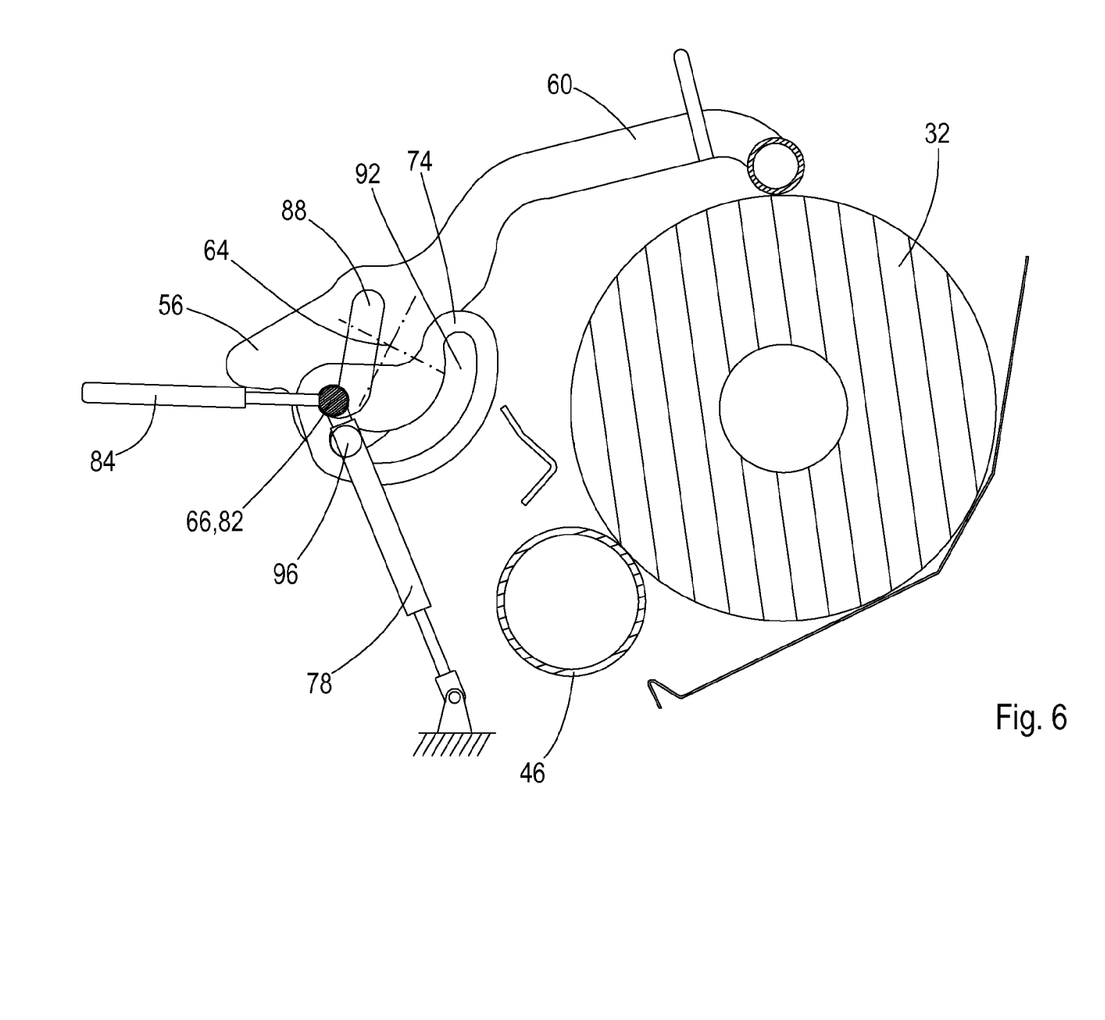
FIG. 6 a diagrammatic side view of the pressing device of FIG. 2 in an engagement position with the adjusting means in an operating position with an unused supply reel.
Figure 7:
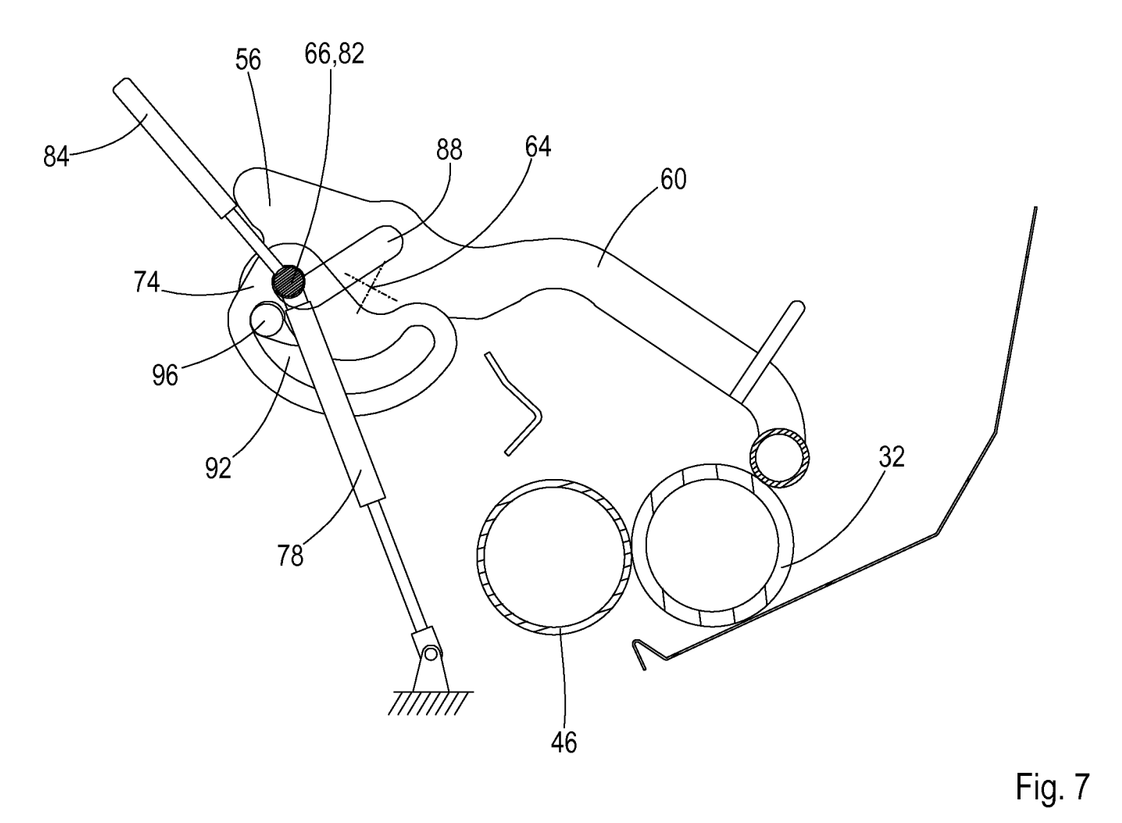
FIG. 7 a diagrammatic side view of the pressing device of FIG. 2 in an engagement position with adjusting means in an operating position with used supply reel.

Starting from an unused supply reel 32, an engagement position for the pressing device 42 and an operating position for the adjusting means (A) according to FIGS. 6 and 7, the contact point 82 and adjusting axis 66 are located at the end of a short arm of the l-shaped first guide groove 88 so that a controlling torque is produced which presses the pressing device 42 onto the supply reel 32, and the pressing frame 48 is pressed onto the supply reel 32. The guide bolt 96 is located in a stop position on a first end of the guide groove 92. The lever arm for the controlling torque thereby lies in relation to the supply reel 32 behind the pivotal axis 64 of the outer pivotal arm 56.

FIG. 7 shows the position of the pressing device 42 in an advanced operating stage with a used supply reel 32. The pressing frame 48 has a position inclined towards the supply reel 32 in contrast to FIG. 6, wherein the contact point 82 and the lever arm for the controlling torque lie practically unchanged behind the pivotal axis 64. Also here a controlling torque is produced pressing onto the supply reel 32.

Figure 8:
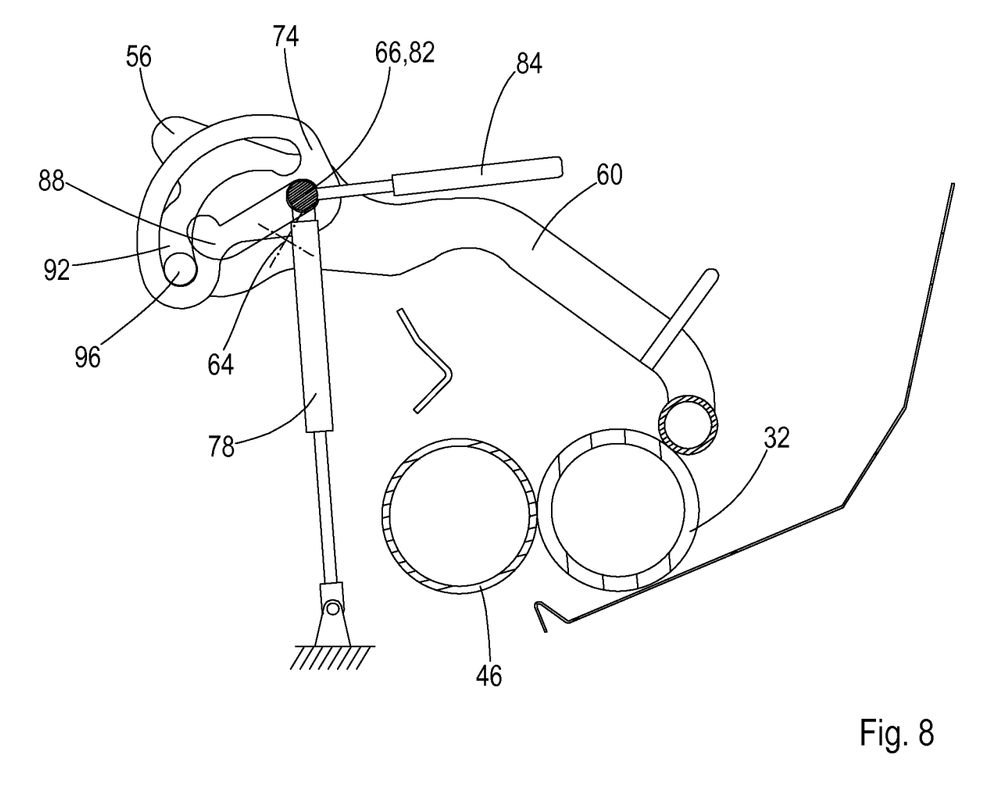
FIG. 8 a diagrammatic side view of the pressing device of FIG. 2 in an engagement position with adjusting means in a standby position with used supply reel.

FIG. 8 shows a position of the pressing device 42 in which the pressing frame 48 is furthermore resting on the supply reel 32, only that here the adjusting means (A) have been brought into a standby position for exchanging the supply reel 32. The control lever 84 was for this pivoted in the direction of the supply reel 32 and thus also the adjusting axis 66 connected rotationally secured to the control lever 84 has rotated clockwise. The rotation of the adjusting axis 66 causes at the same time a clockwise rotation of the guide plate 74 which is connected rotationally secured to the adjusting axis 66. As a result of the rotation of the guide plate 74 the guide bolt 96 is guided along the second guide groove 92 to the other end of the second guide groove 92 whereupon the adjusting axis 66 is moved out from its first position at the end of the short arm of the l-shaped first guide groove 88 and is moved along the further path of the l-shaped first guide groove 88 to the end of the long arm of the l-shaped first guide groove 88 and comes to a stop there. In this position the contact point 82 which is connected to the adjusting axis 66, and thus the lever arm for the generated controlling torque, lie between the pivotal axis 64 and the supply reel 32 so that a controlling torque is generated which moves the pressing device 42 away from the supply reel 32. Depending on the strength of the power means and the weight of the pressing device this can also lead to the pressing frame 48 lifting up off the supply reel 32, but at the least however this assists an anti-clockwise pivotal movement which is to be executed against the weight of the pressing device 42 in order to bring the pressing device 42 into the standby position which is illustrated in FIG. 9.

Figure 9:
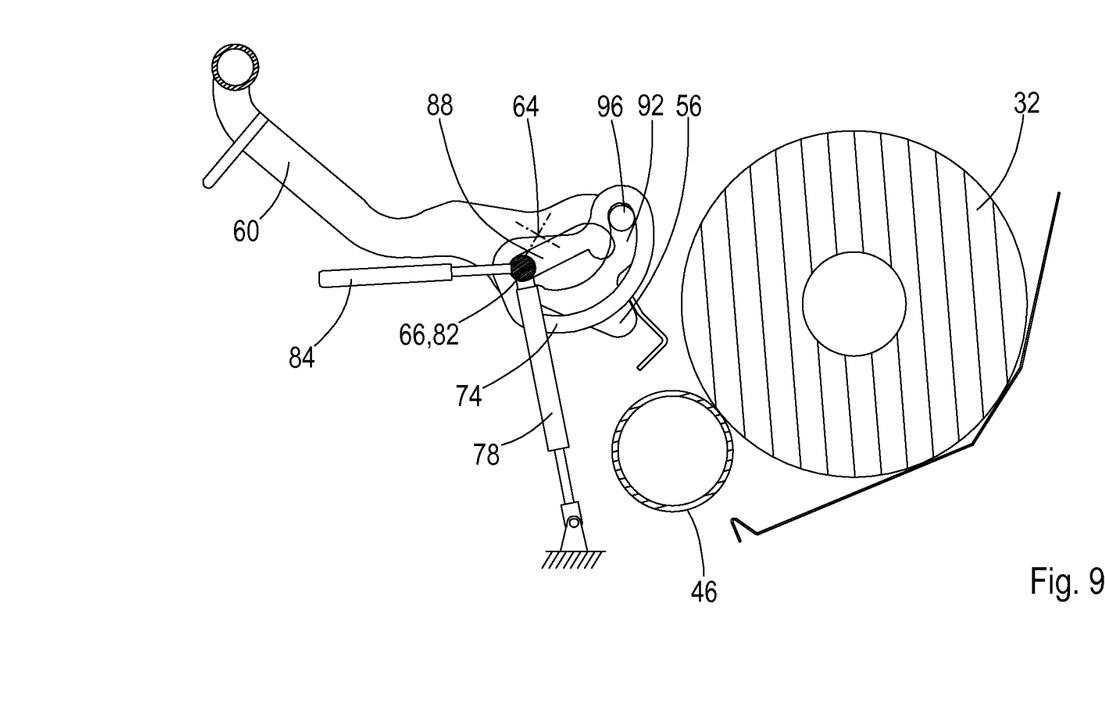
FIG. 9 a diagrammatic side view of the pressing device of FIG. 2 in standby position with adjusting means in standby position with a new unused supply reel, and FIG. 10 a diagrammatic side view of the pressing device of FIG. 2 in engagement position with adjusting means in standby position with new unused supply reel.
Figure 10:
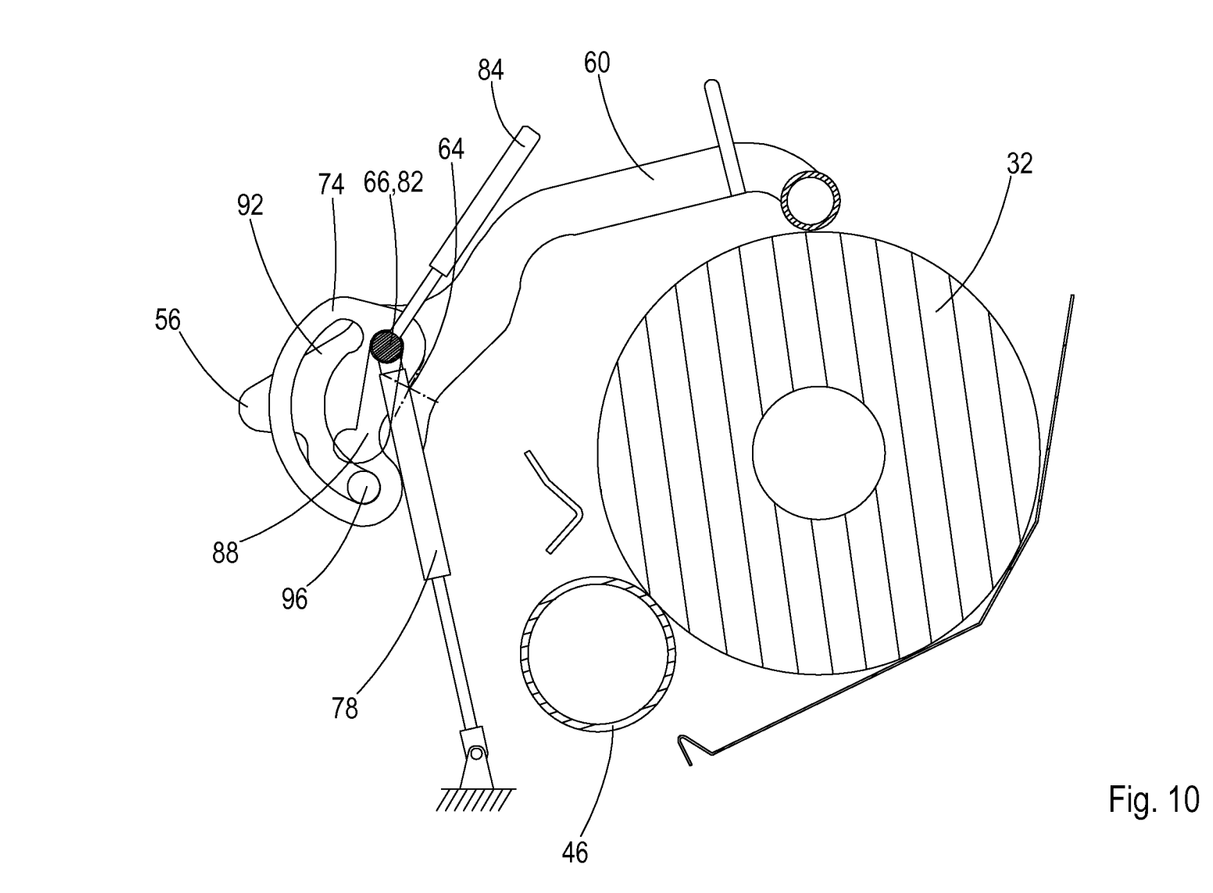

In the standby position illustrated in FIG. 9 the region above the supply reel 32 is opened up so that the supply reel can be effortlessly exchanged. The adjusting means (A) thereby remain furthermore in the standby position, as already described in relation to FIG. 8. As can be seen in FIG. 9 the contact point 82 is moved by the pivotal moment of the pressing device 42 into the standby position behind the pivotal axis 64 so that again a controlling torque is generated which moves the pressing device 42 up to the supply reel 32.

After the supply reel 32 has been replaced the pressing frame 42 is again pivoted back into its engagement position (see FIG. 10), wherein the controlling torque described in FIG. 9 produces a boost action. The contact point 82 is moved by the pivotal movement of the pressing device 42 again in the direction of the supply reel 32 wherein as a result of the unused supply reel having a larger diameter the pressing frame 48 now occupies a higher pivotal position and the contact point remains close behind the pivotal axis. Thus also in the standby position of the adjusting means (A) illustrated in FIG. 10 a controlling torque is generated, which may be comparatively light, which moves the pressing device 42 towards the supply reel 32.

Through an anti-clockwise pivotal movement of the lever the adjusting means (A) are again brought into the operating position wherein a course for the displacement of the contact point 82 is set opposite to that illustrated according to FIG. 8, and the pressing device 42 as well as the adjusting means (A) again occupy the positions illustrated in FIG. 6.

Even though the invention was described only with reference to one embodiment, in the light of the above description and drawings numerous different alternatives, modifications and variations, all falling within the present invention, would be apparent for one skilled in the art.

The invention claimed is:

1. A bale wrapping device for a round baler, comprising:
a supply reel having wrapping material;
a pressing device having an engagement position, wherein the pressing device is in engagement with the supply reel, and a standby position, wherein the pressing device is pivoted away from the supply reel, the pressing device being connected to a spring at a contact point, which generates a controlling torque acting on the pressing device; and
an adjusting means configured to shift the contact point and thus change the controlling torque, the adjusting means comprising a first guide groove formed in at least one pivotal arm of the pressing device, a guide plate connected to an adjusting axis and formed with a second guide groove, and a guide fastener which is displaceably mounted in the second guide groove and connects the at least one pivotal arm and the guide plate, wherein the adjusting axis is displaceably mounted in the first guide groove.

2. The bale wrapping device of claim 1, wherein in the engagement position of the pressing device and in an operating position of the adjusting means, the contact point is positioned so that the controlling torque presses the pressing device onto the supply reel.

3. The bale wrapping device of claim 1, wherein in the event of a used supply reel in the engagement position of the pressing device and in a standby position of the adjusting means, the contact point is positioned so that the controlling torque acts counter to a controlling torque in the operating position.

4. The bale wrapping device of claim 1, wherein in the standby position of the pressing device and in a standby position of the adjusting means, the contact point is positioned so that the controlling torque boosts a pivotal movement in the direction of the supply reel.

5. The bale wrapping device of claim 1, wherein the adjusting means further comprise a control lever which is securely connected to the adjusting axis.

6. The bale wrapping device of claim 1, wherein the spring is connected to the adjusting axis.

7. The bale wrapping device of claim 1, wherein the pressing device is mounted on a locally fixed pivotal axis, configured to pivot into the engagement position or into the standby position, and a position of the contact point relative to the pivotal axis is altered via the adjusting means.

8. A round baler comprising the bale wrapping device of claim 1.

* * * * *